Sept. 5, 1933.    H. CREMER    1,925,233
BRAKE FOR MOTOR VEHICLES
Original Filed Oct. 22, 1931    2 Sheets-Sheet 1
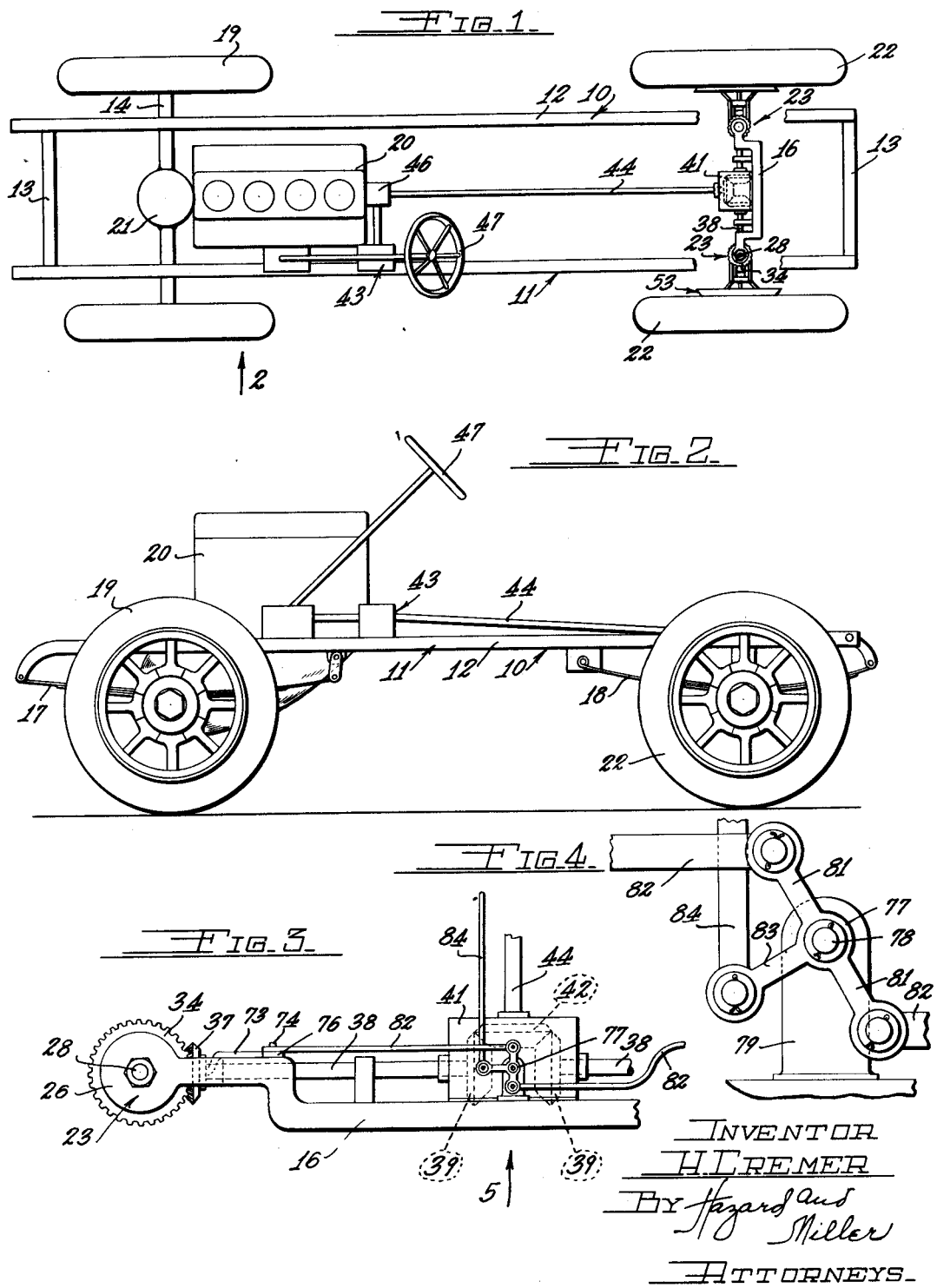

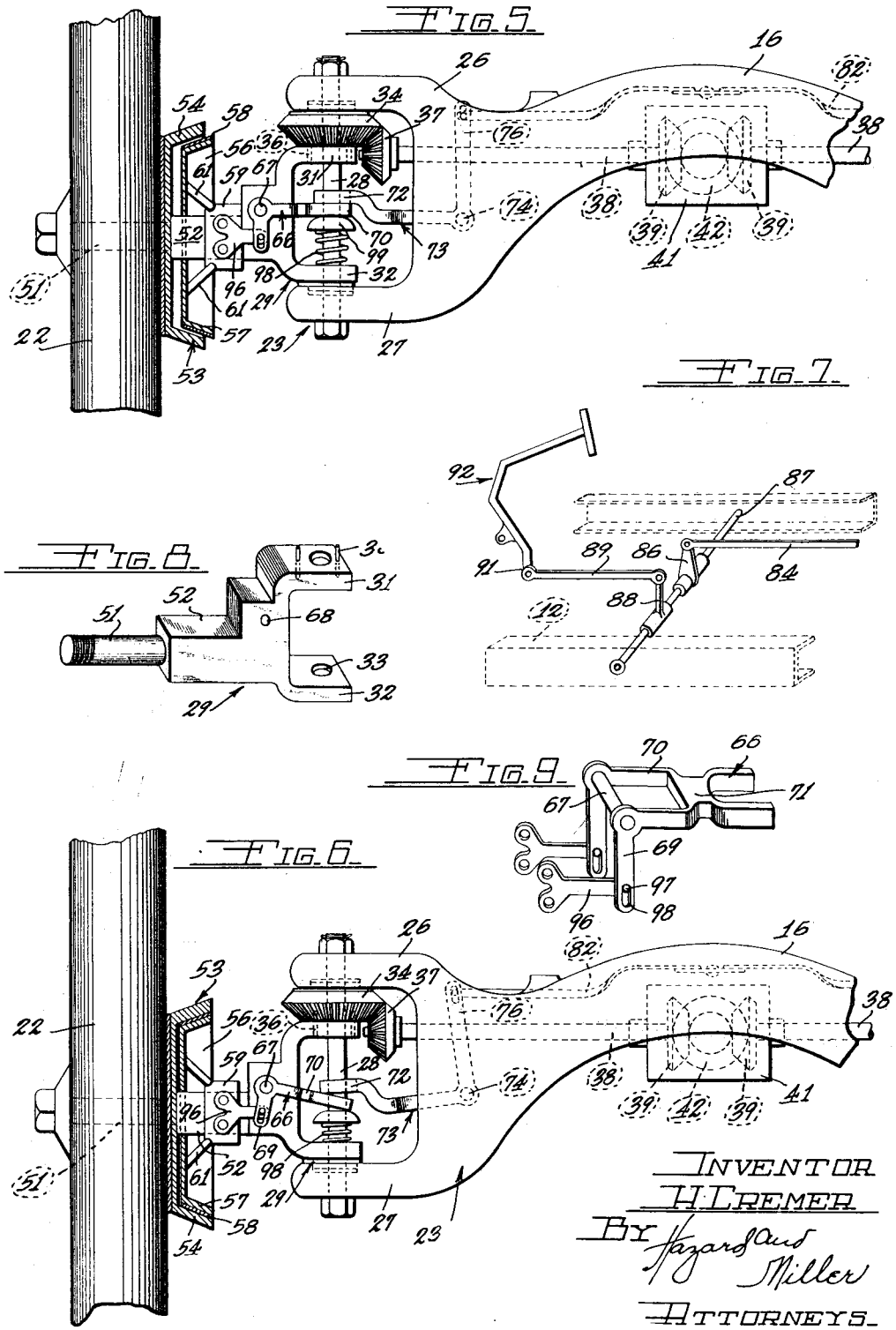

Patented Sept. 5, 1933

1,925,233

UNITED STATES PATENT OFFICE 1,925,233

BRAKE FOR MOTOR VEHICLES

Henry Cremer, Southgate, Calif.

Original application October 22, 1931, Serial No. 570,420. Divided and this application August 31, 1932. Serial No. 631,223

5 Claims. (Cl. 188—71)

This invention relates to automotive vehicles and has for its object to provide a braking mechanism particularly adapted for use in conjunction with automotive vehicles wherein the power is applied to the front wheels and the steering is accomplished by means of the rear wheels. The invention, however, is not limited thereto and may be applied to steering wheels whether applied in front or in the rear of the vehicle.

It is an object of this invention to provide simple and efficient mechanical means without the use of flexible members to operate the brake mechanism positively irrespective of the position of the wheel.

The present invention is a division of my patent for rear axle steering with front wheel drive, granted February 14, 1933, No. 1,897,551, which case is limited to the steering mechanism but discloses the present invention relating to the brake mechanism which is claimed in the present application.

My invention consists in the construction and combination of parts hereinafter described and claimed.

In the accompanying drawings, which form a part of the specification, I have illustrated the preferred embodiment of my invention and, in which:

Fig. 1 is a top plan view of the chassis of an automobile embodying the principles of the present invention, portions of the figure being broken away to disclose some of the operative portions of the device.

Fig. 2 is a view in side elevation, the direction of view being indicated by the arrow 2 of Figure 1.

Fig. 3 is an enlarged top plan view of the rear axle assembly, a portion of the figure being broken away to reduce its size.

Fig. 4 is an enlarged top plan view of a portion of the structure illustrated upon Figure 3.

Fig. 5 is a view in rear elevation of the rear axle assembly, the direction of view being indicated by the arrow 5 of Figure 3. A portion of the braking mechanism is shown in vertical section, with the operative portions of the device in brake releasing position.

Fig. 6 is a view similar to Figure 5, with the brake applied.

Fig. 7 is a diagrammatic perspective view showing a portion of the mechanism for controlling the brake.

Fig. 8 is a perspective view of one of the steering knuckles.

Fig. 9 is a perspective view of one of the double bell cranks which forms a portion of the brake operation mechanism.

Referring more particularly to the drawings, I show at 10 the chassis of an automotive vehicle embodying the principles of the present invention, and comprising a frame 11 having longitudinal members 12 joined by transverse members 13 in accordance with customary practice. Front and rear axles 14 and 16 are mounted upon the frame by front and rear springs 17 and 18, respectively.

A motor 20 of any suitable design is mounted upon the frame 11, and is adapted to deliver rotative power to the front wheels 19 which are mounted upon the front axle 14, through the expedient of a suitable differential mechanism which is not shown, but which is enclosed within a suitable housing 21.

Steering of the vehicle is accomplished by means of the rear wheels 22 which are mounted upon the rear axle 16 by means of pivots indicated in their entirety at 23.

The construction and operation of the rear axle assembly and the pivots associated therewith will best be understood by reference to Figs. 3, 5, and 6. Each end of the rear axle 16 is bifurcated to provide vertically spaced prongs 26 and 27 extending substantially parallel with each other. A vertical shaft 28 extends between the prongs 26 and 27 at each end of the rear axle 16, and serves as the pivotal mounting for a steering knuckle 29 which is illustrated in detail upon Fig. 8. The inner end of each steering knuckle 29 is bifurcated to provide spaced prongs 31 and 32 having alined apertures 33 therein, whereby each knuckle is mounted upon the associated vertical shaft 28 with the prongs 31 and 32 disposed between the prongs 26 and 27. The distance between the outer surfaces of the prongs 31 and 32 is sufficiently less than the distance between the inner surfaces of the prongs 26 and 27 to permit a bevel gear 34 to be accommodated between the upper prong 31 of each steering knuckle and the upper prong 26 at the associated end of the axle 16. This gear 34 is rigidly connected to the upper prong 31 of the steering knuckle in any suitable manner, such as by pins 36. Each of the bevel gears 34 is enmeshed by a driving bevel gear 37 mounted rigidly upon a transverse shaft 38 which extends from the associated pivot 23 to a position adjacent the central portion of the axle 16, where it is provided with another bevel gear 39 within a suitable housing 41. Both gears 39 are enmeshed with another gear 42 within the housing 41, but upon opposite sides of the axis of rotation thereof, so that when the gear 42 is turned, the gears 39 and their respective shafts 38 will also be turned, but in opposite directions with respect to each other. This will cause rotation of the gears 34, both turning in the same direction and carrying with them the steering knuckles 29, to which they are rigidly secured. This movement of the steering knuckles is effected by a suitable steering mechanism 43, which includes a shaft 44 upon which the gear 42 is mounted, and which is connected by any suitable mechanism 46 to a steering wheel 47 conveniently accessible to the driver of the vehicle.

Each of the steering knuckles 29 is provided with a spindle portion 51, upon which the associated rear wheel 22 is journaled for free rotation thereabout; and between the spindle 51 and the prongs 31 and 32 of each steering knuckle 29 a non-circular portion 52—preferably square—is provided.

A brake drum 43 is mounted rigidly upon each of the rear wheels 22, but instead of being cylindrical, the flange 54 of each drum 53 has the configuration of a conical frustum. Associated with each of the brake drums 53 is another conical brake member 56, which also is provided with a frusto-conical flange 57, upon the outer surface of which a suitable friction lining 58 is provided. The brake member 56 is adapted to be received inside the conical flange 54 of the drum 53, the parts being so proportioned and arranged that when the member 56 moves into the drum 53 the lining 58 will be pressed against the inner surface of the flange 54 to resist relative rotation between the members 56 and 53. The member 56 is mounted for sliding movement upon the non-circular portion 52 of the associated steering knuckle 29, the result being that it is held against rotation. For this purpose, each of the inner brake members 56 is provided with a head 59 having a bore substantially complementary in shape to the cross sectional configuration of the non-circular portion 52 of the associated steering knuckle, this head being rigidly connected to the associated inner brake member 56 in any suitable manner, and preferably provided with braces 61 to yield a stronger construction.

The brake actuating mechanism comprises a double bell crank 66 associated with each of the brake members 56. Each bell crank embraces the associated steering knuckle 29 and is pivotally mounted thereupon by means of a horizontal pin 67 extending through a hole 68 provided in the steering knuckle 29 for that purpose. From the pin 67 one leg 69 extends vertically downwards upon each side of the knuckle 29, and another leg 70 extends horizontally upon each side of the knuckle 29 from the pivot pin 67. In order to yield a unitary construction of the double bell crank 66, I prefer that the two horizontal legs 70 be joined as by a web 71, from which, however, the two legs 70 extend far enough to embrace the associated vertical shaft 28. Those portions of the horizontal legs 70 which embrace the vertical shaft 28 are engaged by the bifurcated end 72 of a lever 73, which also embraces the same shaft 28, the bifurcated end 72 resting upon the upper surface of the legs 70, as clearly shown upon Figs. 5 and 6. Each of these levers 73 is pivoted as by a pin 74 adjacent the associated end of the axle 16, and rigid with each lever 73 is an arm 76 extending upwards from the associated pin 74.

Means are provided for forcing the arms 76 of both levers 73 outwards so as to apply the brakes associated with both rear wheels 22 simultaneously. This brake applying mechanism comprises a T shaped lever 77 pivoted as at 78 upon a lug 79 rigid with the axle 16 substantially midway between its ends. Each of two oppositely extending legs 81 is connected by a push rod 82 to the arm 76 of one of the levers 73, and the third leg 83 of the lever 77 is connected to another push rod 84 which extends forwards to be pivoted to a crank 86 carried by a transversely extending shaft 87 mounted for rocking movement in the longitudinal members 12 of the frame 11. This shaft 87 is adapted to be rocked by means of another crank 88 rigid therewith, and connected by a link 89 to the lower end 91 of a brake pedal 92 in such a manner that when the pedal 92 is depressed the link 89 will be pushed, thereby turning the rock shaft 87 and pushing the push rod 84 toward the rear of the vehicle, thereby causing the T shaped lever 77 to turn in a counterclockwise direction, as viewed upon Fig. 4. This causes both push rods 82 to be pushed laterally outwards, thereby swinging the bifurcated ends 72 of the levers 73 downwards and pressing the horizontal legs 70 of both bell cranks downwards. This causes the vertical legs 69 of the bell cranks to be forced outwards. The vertical legs 69 of each bell crank 66 are connected to the head 59 of the associated inner brake member 56 by links 96 having pins 97 disposed in slots 98 in the legs 69, so that when the bell cranks 66 are turned as hereinabove described, the links 96 will be forced outwards, pressing the associated inner brake member 56 into the outer brake member 53, and thereby developing resistance to rotation of the associated wheel 22. The brake is normally held released by a coil spring 98 encircling each shaft 28, and under compression between the associated prong 32 and a washer 99 which is pressed upwards against the under surface of the horizontal legs 70 of the associated bell crank 66.

It is to be understood that the details of the invention as herein disclosed are subject to alteration within the spirit or scope of the appended claims.

I claim:

1. A brake for a motor vehicle comprising an axle bifurcated at each end to provide a pair of vertically spaced prongs, a substantially vertical shaft mounted in said prongs, a spindle mounted for pivotal movement on a substantially vertical axis on each end of said axle, a wheel journaled upon each of said spindles, the spindle having a non-circular portion adjacent the inner end of the associated wheel, a brake member slidably mounted upon the non-circular portion, a second brake member carried by the wheel and adapted to be engaged by the associated slidable brake member, a double bell crank embracing each non-circular portion and pivoted thereto for movement about a horizontal axis, means connecting one end of each of said cranks to the associated slidable brake member and the other end of each of said cranks embracing the vertical shaft, a lever pivoted adjacent each end of said axle and having one end embracing the associated vertical shaft and engaging the associated bell crank, and means for operating said levers.

2. A brake for a motor vehicle comprising an axle bifurcated at each end to provide a pair of vertically spaced prongs, a substantially vertical shaft mounted in said prongs, a spindle mounted for pivotal movement on a substantially vertical axis on each end of said axle, a wheel journaled upon each of said spindles, the spindle having a non-circular portion adjacent the inner end of the associated wheel, a brake member slidably mounted upon the non-circular portion, a second brake member carried by the wheel and adapted to be engaged by the associated slidable brake member, a double bell crank embracing each non-circular portion and pivoted thereto for movement about a horizontal axis, means connecting one end of each of said cranks to the associated slidable brake member and the other end of each of said cranks embracing the vertical shaft, a lever pivoted adjacent each end of said axle and having one end embracing the associated vertical shaft and engaging the associated bell crank, means for operating said levers, and resilient means tending to move the slidable brake member into inoperative position.

3. A brake for a motor vehicle comprising an axle bifurcated at each end to provide a pair of vertically spaced prongs, a substantially vertical shaft mounted in said prongs, a spindle mounted for pivotal movement on a substantially vertical axis on each end of said axle, a wheel journaled upon each of said spindles, the spindle having a non-circular portion adjacent the inner end of the associated wheel, a brake member slidably mounted upon the non-circular portion, a second brake member carried by the wheel and adapted to be engaged by the associated slidable brake member, a double bell crank embracing each non-circular portion and pivoted thereto for movement about a horizontal axis, means connecting one end of each of said cranks to the associated slidable brake member and the other end of each of said cranks embracing the vertical shaft, a lever pivoted adjacent each end of said axle and having one end embracing the associated vertical shaft and engaging the associated bell crank, means for operating said levers, and a spring surrounding said shaft and interposed between each bell crank and the lower prong of the axle tending to move the slidable brake member into operative position.

4. A brake for a motor vehicle comprising an axle bifurcated at each end to provide a pair of vertically spaced prongs, a substantially vertical shaft mounted in said prongs, a spindle mounted for pivotal movement on a substantially vertical axis on each end of said axle, a wheel journaled upon each of said spindles, the spindle having a non-circular portion adjacent the inner end of the associated wheel, a brake member slidably mounted upon the non-circular portion, a second brake member carried by the wheel and adapted to be engaged by the associated slidable brake member, a bell crank pivoted to the non-circular portion for movement about a horizontal axis, means connecting one end of said crank to the associated slidable brake member, the other end of said crank embracing the vertical shaft, a lever pivoted adjacent each end of said axle and having one end embracing the vertical shaft and engaging the associated bell crank, and means for operating said levers.

5. A brake for a motor vehicle comprising an axle bifurcated at each end to provide a pair of vertically spaced prongs, a substantially vertical shaft mounted in said prongs, a spindle mounted for pivotal movement on a substantially vertical axis on each end of said axle, a wheel journaled upon each of said spindles, the spindle having a non-circular portion adjacent the inner end of the associated wheel, a brake member slidably mounted upon the non-circular portion, a second brake member carried by the wheel and adapted to be engaged by the associated slidable brake member, a lever pivoted for movement on a horizontal axis on the non-circular portion, one end of said lever being connected to the associated slidable brake member, the other end of said lever being bifurcated to embrace the vertical shaft, a lever pivoted adjacent each end of said axle for movement on a horizontal axis and having one end bifurcated and embracing the vertical shaft in engagement with the bifurcated end of the first mentioned lever, and means for operating said levers.

HENRY CREMER.